H. C. CRAGG.
FEEDING MECHANISM FOR STEMMING MACHINES.
APPLICATION FILED AUG. 5, 1905.
1,325,144.
Patented Dec. 16, 1919.
2 SHEETS—SHEET 1.
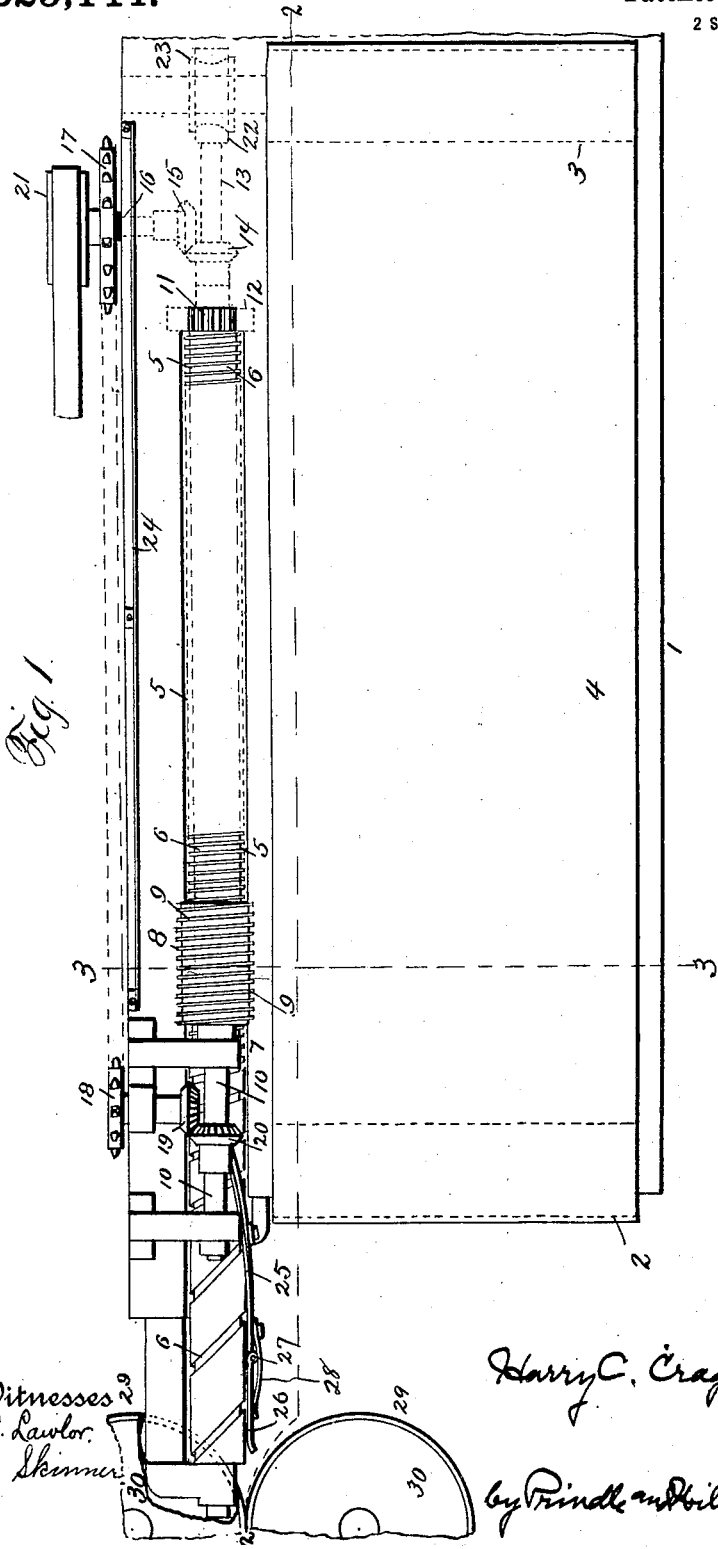
Witnesses
J. L. Lawlor
L. A. Skinner
Harry C. Cragg, Inventor,
by Prindle and Williams, Attorneys,

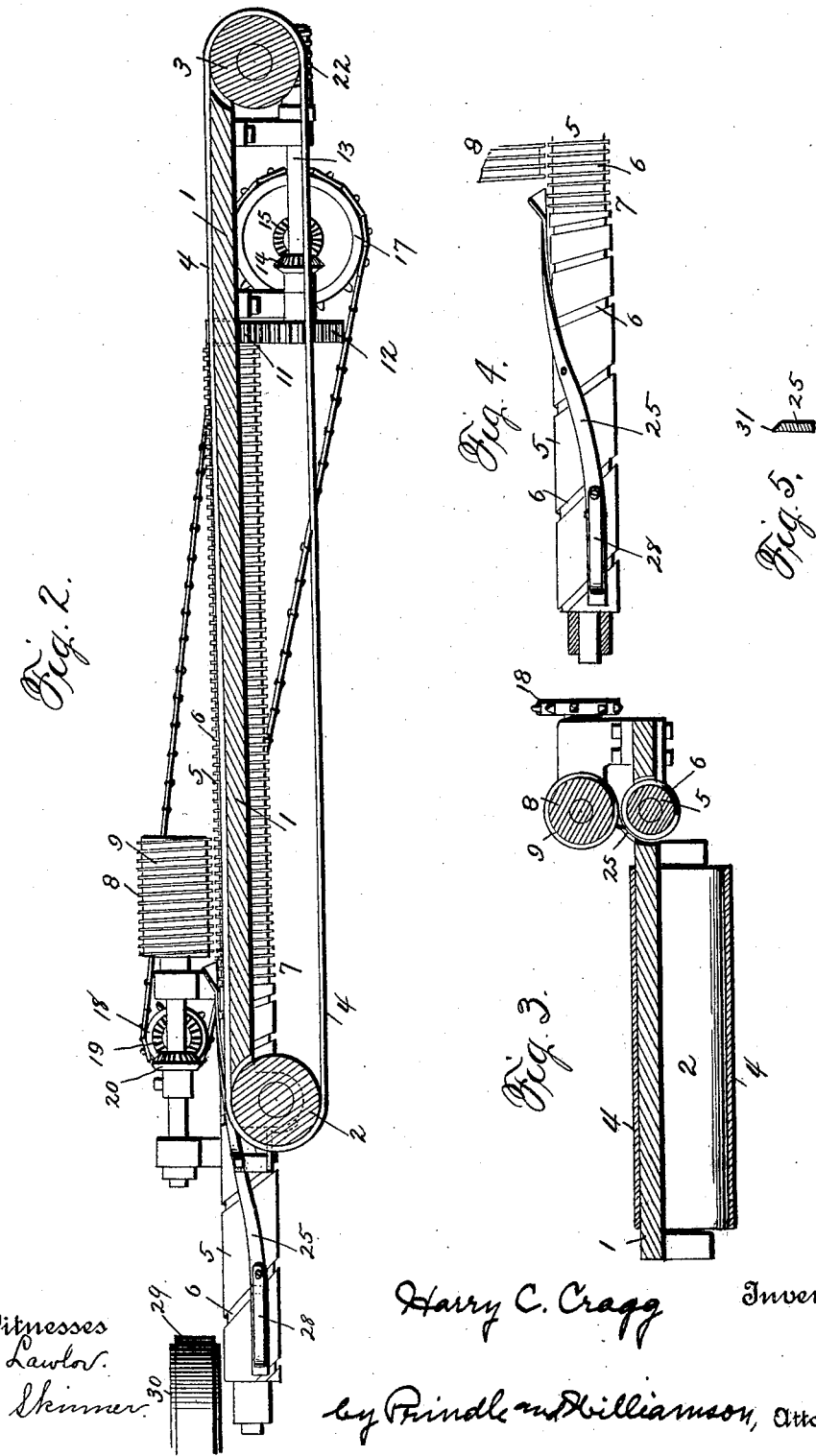

UNITED STATES PATENT OFFICE.

HARRY C. CRAGG, OF WASHINGTON, DISTRICT OF COLUMBIA.

FEEDING MECHANISM FOR STEMMING-MACHINES.

1,325,144.  Specification of Letters Patent.  Patented Dec. 16, 1919.

Application filed August 5, 1905. Serial No. 272,915.

*To all whom it may concern:*

Be it known that I, HARRY C. CRAGG, of Washington, in the District of Columbia, have invented a certain new and useful Improvement in Feeding Mechanism for Stemming-Machines, and do hereby declare that the following is a full, clear, and exact description thereof, reference being had to the accompanying drawings, in which—

Figure 1 is a plan view of a machine embodying my invention;

Fig. 2 is a longitudinal sectional view on the line 2—2 of Fig. 1;

Fig. 3 is a transverse sectional view on the line 3—3 of Fig. 1, looking in the direction of the arrows; and, Fig. 4 is a detail view of the exit end of the feeding mechanism.

The object of my invention has been to provide feeding mechanism for tobacco-stemming machines, which shall efficiently separate the stems of a bunch of leaves, and present them singly and in proper position to the stemming machine, and to such end, my invention—

Consists in the feeding mechanism for stemming machines hereinafter specified.

In carrying my invention into practice, I provide a frame 1, in the form of a plate, which frame, at its forward and rearward ends, has bearings for rollers 2 and 3. The upper portions of the peripheries of the said rollers are slightly above the upper surface of the frame 1, and a feeding belt 4 extends over the said rollers and lies upon the said frame. A cylinder 5 is journaled in bearings on the frame, in a position parallel to the belt 4, and with its upper surface slightly above the level of the belt 4. The cylinder 5 is provided with a thread 6 that is of such a depth as to receive the stem of a single leaf. The said thread, beginning at the receiving or right-hand end of the cylinder, as seen in Fig. 1, is of slight, and preferably uniform, pitch, until it reaches a point 7 at the end of a separator cylinder, to be later described, where the pitch of the thread gradually increases until, at the rear or exit end of the cylinder 5, the thread extends rearward at an angle of about 45°. Above the feeding cylinder is a separator, of any desired form, to prevent the stems of the leaves from going rearward more than one at a time. The form of separator which I have chosen for illustration consists of a cylinder 8 having a screw-thread 9 corresponding to that on the receiving end of the cylinder 5, the said threads registering so that a stem is inclosed between coinciding portions of the two said threads. The cylinder 8 is mounted upon a shaft 10, supported in bearings on the frame. The gearing for driving the belt and cylinder is as follows:—The cylinder 5 has a left-hand rotation, as viewed at its forward end, and such cylinder carries on its shaft a pinion 11, which meshes with a gear 12, on a shaft 13, that is mounted in the bracket beneath the cylinder 5. The shaft 13 has a bevel gear 14, meshing with a bevel gear 15, on a shaft 16, that is also journaled in a bracket beneath the frame. The shaft 16 is provided with a sprocket-gear 17, that transmits motion by means of a sprocket-chain to a sprocket-gear 18 on a shaft carrying a bevel-gear 19, which meshes with a bevel-gear 20 on the shaft 10 of the separator cylinder 8. The feed-screw and separator-screw are thus rotated in the same direction, so that they may each have threads of the same character, right or left. If desired, of course, the separator-screw may revolve in the opposite direction from the feed-screw, if such screws are provided with threads of an opposite character. The shaft 16 is provided with a driving pulley 21, although power can be applied to the machine in any known manner. The shaft 13 is provided with a worm 22, driving a worm-gear 23 on the shaft of the roller 3.

A gage or stop-plate 24 is secured to the frame of the machine, parallel to the feed-screw 5, in order to properly position the stems of the leaves. A shield 25, in the form of a strip, is supported by brackets over the delivery end of the feed-screw. The said shield extends from a point closely in the rear of the separator-screw 8, and on top of the feed-screw, in a spiral direction, down to the side of the feed-screw. Its end 24 next to the separator screw is curved upward, to insure that the leaves shall pass under it. Its rear end 26 is pivoted to the main strip by a pintle 27, and is yieldingly held against the side of the feed-screw by a spring 28.

The operation of my feeding mechanism is as follows:—A bunch of leaves is thrown on the apron, with the stems lying across the feed-screw and against the gage-plate.

The leaves are, preferably, roughly separated by hand as they travel rearward on the belt and feed-screw. The stems strike against the face of the separator-screw 8 and, as the thread of the said screw comes around toward the stems, it picks up one stem, and only one, and such stem passes rearward, confined between the feed-screw and the separator-screw, until it passes under the forward end of the shield. The shield then holds the stem against the feed-screw, and, as the leaf falls off the rear end of the belt, the shield assumes a vertical position, so that the stem is held in a vertical plane, and is projected rearward at an angle of 45°. In order to prevent thin stems from falling out from between the shield and the cylinder, the upper edge of the shield is sharpened, as at 31, and the stem catches upon the said edge, and is prevented from falling. The stem, projected rearward, in the position described, passes between feed belts 29, on pulleys 30, of the stemming machine, or other form of engaging mechanism on the stemming machine.

It is obvious that various changes can be made in the above-described construction which will be within the spirit of my invention, and I desire not to be limited beyond the terms of my claims and the requirements of the prior art. For instance, the screw-thread of the feeding screw may be in the form of a spiral spring wound upon the cylinder 5, which spring is free to move longitudinally of the cylinder. The stems will thus not only be held by the separator-screw and shield, but they may be pinched laterally by the coils of the spring contracting in the direction of the length of the cylinder.

It will be seen that by the combined action of the screw in separating the leaves and forming them in a progressing row or line, and the gage plate which prevents endwise movement of the leaves, the leaves are formed or disposed so that the stem butts are in a row or line. The screw acts to position the leaves on the conveyer belt.

Having thus described my invention, what I claim is—

1. In a device for feeding tobacco leaves to a stemming machine, the combination of means for receiving a plurality of leaves in a horizontal position and carrying them toward the machine, means for gripping the stems singly adjacent to their butt ends and presenting them to the stemming machine in an angular position with the butt of each leaf in advance of the other portions thereof.

2. In a machine of the class described, the combination of means for carrying a bunch of leaves toward a stemming machine, and a single means for separating said leaves and presenting their stems singly to the stemming machine, and in a position inclined toward the stemming machine, the stems being in advance of the leaf.

3. In a machine of the class described, the combination of means for carrying leaves toward a stemming machine, and a screw coöperating with said means adapted to engage the stems of the leaves singly and thus to separate them.

4. In a machine of the class described, the combination of means for carrying leaves toward a stemming machine, said leaves lying transverse to the direction of motion, and a screw adapted to engage the stem of said leaves to separate them from each other and to carry them toward the stemming machine.

5. In a machine of the class described, the combination of feed and separator screws having registering threads, said separator screw being shorter than said feed screw, the thread of said feed screw increasing in pitch in the rear of said separator screw.

6. In a machine of the class described, the combination of feed and separator screws having registering threads, said separator screw being shorter than said feed screw, the thread of said feed screw increasing in pitch in the rear of said separator screw to an angle of substantially 45 degrees to its axis.

7. In a feeding mechanism for stemming machines, the combination of a feed screw having a thread increasing in pitch from its receiving to its delivery end, and means for engaging and retaining the stems of the leaves in said screw.

8. In a machine of the class described, the combination of a feed screw, a belt traveling beside said feed screw for carrying leaves toward a stemming machine and at the same rate of speed as the thread of said screw, and means for engaging the stems of leaves with said thread.

9. In a machine of the class described, the combination of a feed screw, a belt traveling beside said feed screw and at the same rate of speed as the thread of said screw, means for engaging the stem of leaves with said thread, and a gage plate on the opposite side of said belt for positioning stems.

10. In a machine of the class described, the combination of a feed screw, a belt parallel to said feed screw and traveling in the same direction as the thread of said screw, and a separator screw above said feed screw.

11. In a machine of the class described, the combination of a feed screw having a thread increasing in pitch from the receiving to the delivery end thereof, means for separating the stems of leaves and engaging them with said feed screw, and a shield extending along the surface of said screw beyond said separator to retain the stems in engagement with said thread.

12. In a machine of the class described, the combination of a feed screw, a belt traveling parallel to said feed screw and in substantially the same plane as the upper surface of said screw, a separator screw above and coöperating with said feed screw, and a shield extending from said separator to the delivery end of said feed screw, the receiving end of said shield being above said feed screw, said shield terminating along the side of said feed screw, the upper edge of said shield being sharpened.

In testimony that I claim the foregoing I have hereunto set my hand.

HARRY C. CRAGG.

Witnesses:
  CHAS. J. WILLIAMSON,
  CHARLES D. PARKER.